3,548,010
PROCESS FOR THE PRODUCTION OF POLYGLYCERINE
Michio Yoshino, Kobe-shi, Tetsuo Ikeda, Amagasaki-shi, and Shigeo Mukai, Osaka-shi, Japan, assignors to Nippon Zushi Kabushiki Kaisha, Tokyo, Japan
Continuation of application Ser. No. 448,573, Apr. 9, 1965. This application May 28, 1969, Ser. No. 833,847
Claims priority, application Japan, Apr. 11, 1964, 39/20,243
Int. Cl. C07c 43/02, 43/04
U.S. Cl. 260—615
10 Claims

ABSTRACT OF THE DISCLOSURE

Polyglycerine is produced by reacting epichlorohydrin with a concentrated aqueous alkaline solution at a temperature of 50 to 117° C. and a pH greater than 12. The reaction product contains polyglycerine and a metal salt, the latter being removed by filtration, ion exchange or electrodialysis.

---

This is a continuation of application Ser. No. 448,573 filed Apr. 9, 1965 and now abandoned.

This invention relates to a process for the production of polyglycerine. Hitherto, polyglycerine has been manufactured as follows: glycerine is heated to high temperature in the presence of an alkali-catalyst and condensated by dehydration, and then distilling out the unreacted monomeric glycerine to obtain polyglycerine. According to such a conventional method, however, the reaction temperature should be higher than 200° C., the yield of polyglycerine is low and the degree of polymerization of the produced polyglycerine is only about 3. For these reasons, the thus produced polyglycerine has the following defects. Its use in the field of surface active agents is necessarily restricted and the cost is very high.

The present invention provides a process for the production of polyglycerine comprising reacting epichlorohydrin with concentrated alkali solution to produce polyglycerine. Commonly, when epichlorohydrin is hydrolyzed with dilute aqueous sodium hydroxide solution or with an aqueous solution of sodium carbonate, sodium bicarbonate etc., glycerine is produced.

We have found that when epichlorohydrin is hydrolyzed with concentrated aqueous alkali solution of pH above 12, there result various grades of polyglycerine which range from viscous as liquid wheat-gluten to solid matter. We have confirmed that said product is polyglycerine and established the present invention.

According to this invention, epichlorohydrin is held at a temperature between about 50° C. and 117° C., and aqueous concentrated alkali solution having a concentration above 6% and a pH above 12 are added thereto. Alternatively, epichlorohydrin is added to an aqueous concentrated alkali solution which is held at a temperature between 50° C. to 100° C. Hereinafter, "alkali solution" refers to "concentrated alkali solution." From the thus reacted mixture, the alkaline metal salt and water are removed by suitable means to obtain polyglycerine.

Figure 1:
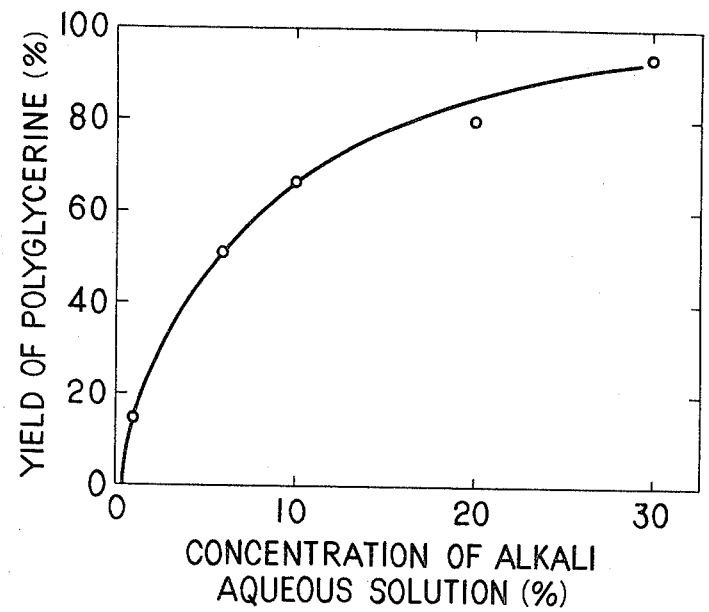

The alkali solution used in the present invention is a solution of an alkaline compound selected from the group consisting of sodium hydroxide, potassium hydroxide and calcium hydroxide. In order to remove the alkali metal salt and water, the following methods are generally used:

A process using a conventional concentrator equipped with a salt remover, which is usually used for the concentration of glycerine to remove salt and water at the same time. A process using ion exchange resins to remove salts and then concentrating. In order to remove salts, however, an electro-dialysis process is preferable, and according to this process desalting may be carried out in a short time, consumption of electric power is very small, and the yield of produced glycerine is nearly quantitative. As shown in FIG. 1, the concentration of the aqueous alkali solution has a relationship to the yield of polyglycerine.

Figure 2:
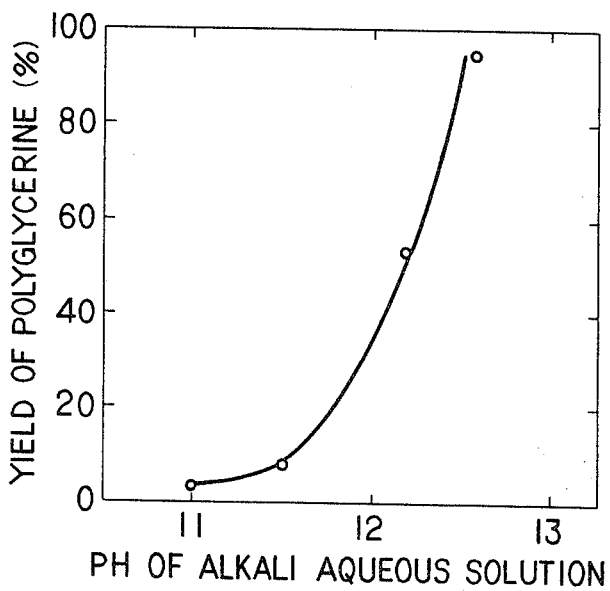

To obtain a yield of at least 50%, there should be used an alkali solution having a concentration of more than 6% by weight. FIG. 2 shows the relationship between the pH value of the alkali solution and the yield of polyglycerine. If the pH of the alkali solution decrease below 11.5 polyglycerine is scarcely produced. Thus, the aqueous alkali solution must have a pH higher than 12.

This reaction can be effected at temperatures from 50° C. to 117° C. which is boiling point of epichlorohydrin. When epichlorohydrin and concentrated aqueous alkali solution are mixed more quickly, the temperature in the reactor increase more rapidly by virtue of the heat of reaction, but when the mixing rate is slow, the temperature in the reactor increases only slightly above that before mixing.

Since the higher the reaction temperature which is used, the higher the degree of polymerization of produced polyglycerine is obtained; in order to get polyglycerine of high molecular weight, it is preferable to use the higher temperature at the beginning of the reaction, or alternatively to use a more rapid mixing rate and beginning the reaction at a temperature of 50° C. According to this invention, since the starting raw material is epichlorohydrin, which is the raw material for producing glycerine, the manufacturing cost is must cheaper than for the process using glycerine itself as starting material. Also all epichlorohydrin used in the reaction can be consumed in the reaction, so it is not necessary to remove unreacted material as in conventional methods. According to this invention the temperature employed is from about 50° C. to 117° C., which is the boiling point of epichlorohydrin, thus it is not necessary to heat to high temperature, moreover the degree of polymerization can be controlled by regulation of the temperature. Thus, one can obtain polyglycerin having higher polymerization degree.

The following examples are given by way of explanation. Parts are by weight unless otherwise specified.

EXAMPLE 1

92.5 parts of epichlorohydrin were introduced into a vessel, and heated to 70° C. While stirring, 140 parts of 30% aq. sodium hydroxide solution were added dropwise therein.

During addition of the above solution, the temperature of the solution in the reactor rose to 117° C. and epichlorohydrin began boiling. The vapor was condensed back to reactor by means of a reflux condenser. Addition of the aqueous sodium hydroxide solution was continued in a manner such that epichlorohydrin does not overflow from the reflux condenser and was stopped after about 30 minutes.

The thus obtained solution was filtered and most of the sodium chloride produced was removed. The filtrate was concentrated by removing water to precipitate more sodium chloride, which was filtered away at about 80° C. Thus, polymeric material of light brown solid was obtained. Analysis of this product by means of infra-red absorption spectrum shows only the absorption by hydroxide radicals, methylene radicals and ether bond.

One could thus recognize the product as polyglycerine. By molecular refraction method, it was found that the molecular weight of these polymers were about 3000 and the degree of polymerization was about 40.

EXAMPLE 2

140 parts of a 30% aqueous sodium hydroxide solution were charged in a vessel and heated at 90° C. While stirring, 92.5 parts of epichlorohydrin were added dropwise within 120 minutes.

After the reaction the solution was filtrated off from sodium chloride. After that, 100 parts of water were added to the filtrate and same was treated with ion exchange resins ("Diaion SK–IA" and "Diaion SA–100"). Thus, the desalted reaction liquid was concentrated by dehydration to obtain a light yellow and viscous wheat-glutenlike polymeric product.

The above material was confirmed as polyglycerine by analysis with an infrared absorption spectrometer as described in the Example 1. The molecular weight of the polymer was found to be about 1100 by means of the molecular refraction method and the degree of polymerization to be about 15.

EXAMPLE 3

84 parts of 50% NaOH aqueous solution were introduced in a reactor, and heated at 100° C.

While stirring, 92.5 parts of epichlorohydrin were added dropwise within 120 minutes.

The reaction solution was treated in the same way as in Example 1 and light yellow and wheat-glutenlike polymers were obtained. This product was found to be polyglycerine by means of infrared absorption spectrum method, and the molecular weight was found to be about 1900 by means of molecular refraction method. The degree of polymerization was about 25. In this case the yield of polyglycerine was 80%.

EXAMPLE 4

A reaction solution obtained by the method of Example 3, was diluted with twice its volume of water.

After desalting by means of electrodialysis and dehydration of the solution, the same polyglycerine as in Example 3 was obtained.

The yield of polyglycerine in this case was 95%.

EXAMPLE 5

92.5 parts of epichlorohydrin were charged to a vessel, and heated at 80° C.

While stirring, 281 parts of 20% aqueous potassium hydroxide solution were added dropwise within 60 minutes.

The solution was treated in an electrodialyzer to remove potassium chloride and water was removed to obtain polyglycerine.

The produced polyglycerine has a molecular weight of about 1000. The yield was 88%.

EXAMPLE 6

92.5 parts of epichlorohydrin were charged to a vessel and heated at 80° C. While stirring, 309 parts of milk of lime having a concentration of 12% by weight were added dropwise within 60 minutes.

The reaction was further continued for an additional 30 minutes at 90° C.

The thus reacted solution was thoroughly dehydrated and the potassium chloride which precipitated was filtered away. After that 100 parts of water were added to this solution and same was treated with ion exchange resin.

The thus treated aqueous solution was concentrated and polyglycerine was obtained. The polyglycerine has a molecular weight of about 750 and the yield was 67%.

EXAMPLE 7

In this example, 270 parts of an aqueous solution containing 33.6 parts of sodium hydroxide and 7.4 parts of calcium hydroxide (5.6 parts as calcium oxide) were used.

Reaction and treatments were carried out in the same manner as in Example 6.

Polyglycerine having a molecular weight of about 800 was obtained.

The yield was 70%.

What is claimed is:

1. A process for the production of polyglycerine, said process comprising adding drop-wise, a concentrated aqueous solution of an alkali metal hydroxide or calcium hydroxide having a concentration of 6 to 50% by weight and a pH greater than 12 to epichlorohydrin maintained at a temperature between about 50° and 117° C. to form a reaction mixture comprising polyglycerine, an alkali metal chloride or calcium chloride in solid form and water, removing from the reaction mixture the solid alkali metal chloride or calcium chloride and water to thereby obtain polyglycerine.

2. A process as claimed in claim 1 wherein the alkali metal hydroxide is sodium hydroxide or potassium hydroxide.

3. A process as claimed in claim 1 wherein the alkali metal chloride or calcium chloride is removed from the reaction mixture by filtration.

4. A process as claimed in claim 1 wherein water is added to the polyglycerine and then said solution is treated with an ion exchange resin to remove alkali metal ion or calcium ion and chloride ion.

5. A process as claimed in claim 1 wherein water is added to the polyglycerine and then said solution is subjected to electrodialysis.

6. A process for the production of polyglycerine, said process comprising adding dropwise, epichlorohydrin to a concentrated aqueous solution of an alkali metal hydroxide or calcium hydroxide having a concentration of 6 to 50% by weight and a pH greater than 12 at a temperature between about 50° and 100° C. to form a reaction mixture comprising polyglycerine, an alkali metal chloride or calcium chloride in solid form and water, removing from the reaction mixture the solid alkali metal chloride or calcium chloride and then water to thereby obtain polyglycerine.

7. A process as claimed in claim 6 wherein the alkali metal hydroxide is sodium hydroxide or potassium hydroxide.

8. A process as claimed in claim 6 wherein the alkali metal chloride or calcium chloride is removed from the reaction mixture by filtration.

9. A process as claimed in claim 6 wherein water is added to the polyglycerine and then said solution is treated with an ion exchange resin to remove alkali metal ion or calcium ion and chloride ion.

10. A process as claimed in claim 6 wherein water is added to the polyglycerine and then said solution is subjected to electrodialysis.

References Cited

UNITED STATES PATENTS

| 1,955,237 | 4/1934 | Jenny | 204—180 |
| 2,302,121 | 11/1942 | Harris | 260—615 |
| 2,382,764 | 8/1945 | Young et al. | 260—615 |
| 2,477,551 | 7/1949 | Wittcoff | 260—615 |
| 2,487,208 | 11/1949 | Alsop | 260—615 |
| 2,520,670 | 8/1950 | Wittcoff et al. | 260—615 |
| 2,810,768 | 10/1957 | Cofer | 260—636 |

OTHER REFERENCES

Miner et al. Glycerol, Reinhold Publishing Corp. (1953) pp. 142–149.

Lawrie, Glycerol and the Glycols, Chemical Catalog Co., New York, (1928) pp. 299–304.

HOWARD T. MARS, Primary Examiner

U.S. Cl. X.R.

204—180; 210—24